Oct. 7, 1930.  A. L. HARRINGTON  1,777,642
PROCESS AND APPARATUS FOR MAKING COMPOSITE GLASS
Filed June 22, 1929  2 Sheets-Sheet 1
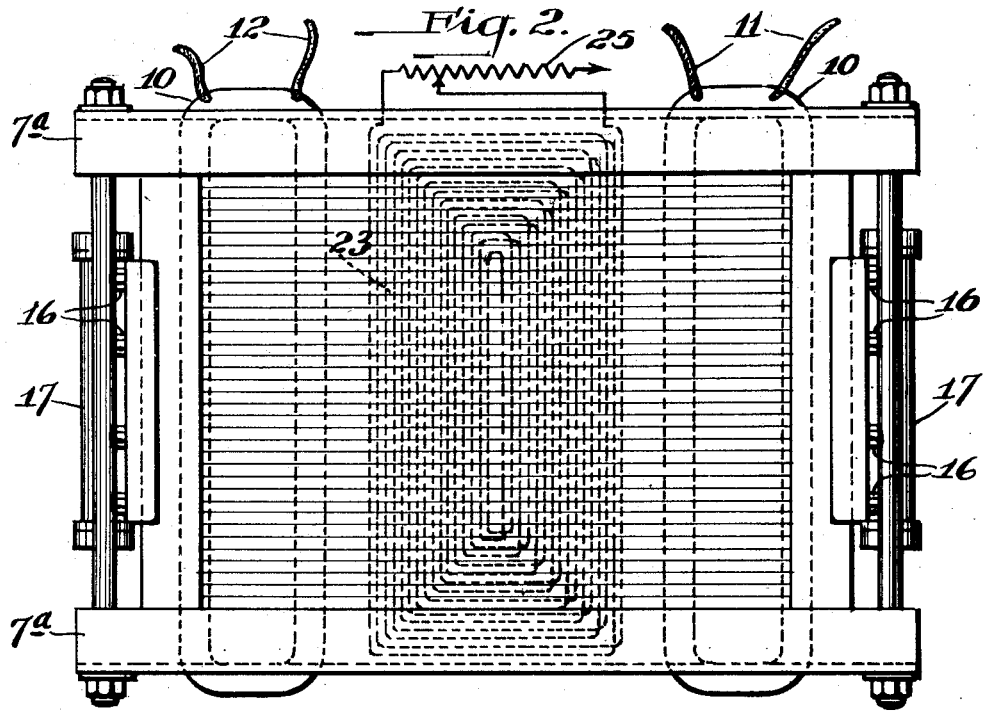
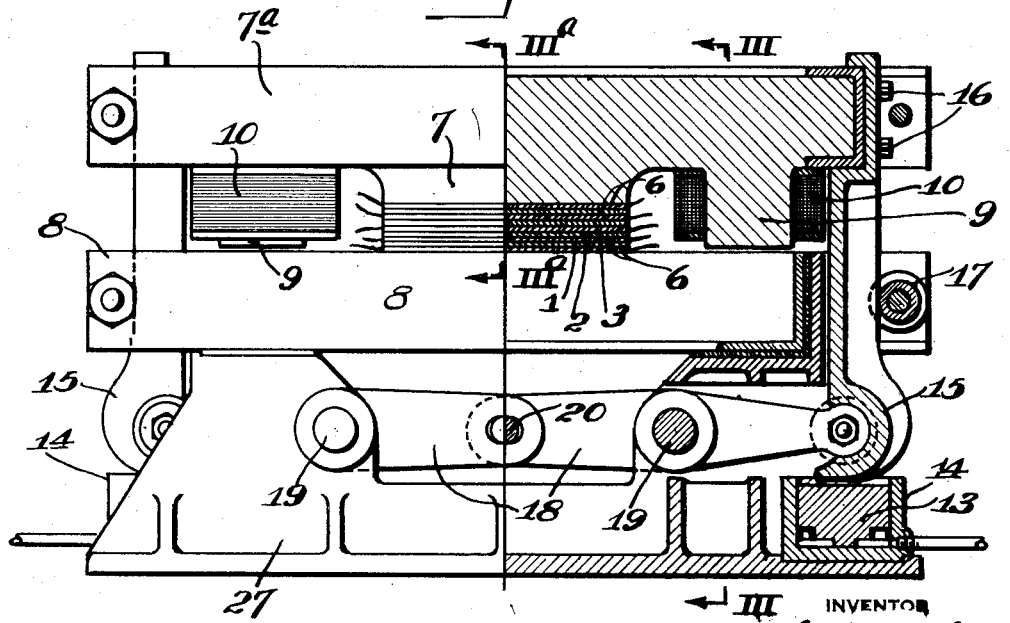

Oct. 7, 1930.  A. L. HARRINGTON  1,777,642
PROCESS AND APPARATUS FOR MAKING COMPOSITE GLASS
Filed June 22, 1929    2 Sheets-Sheet 2
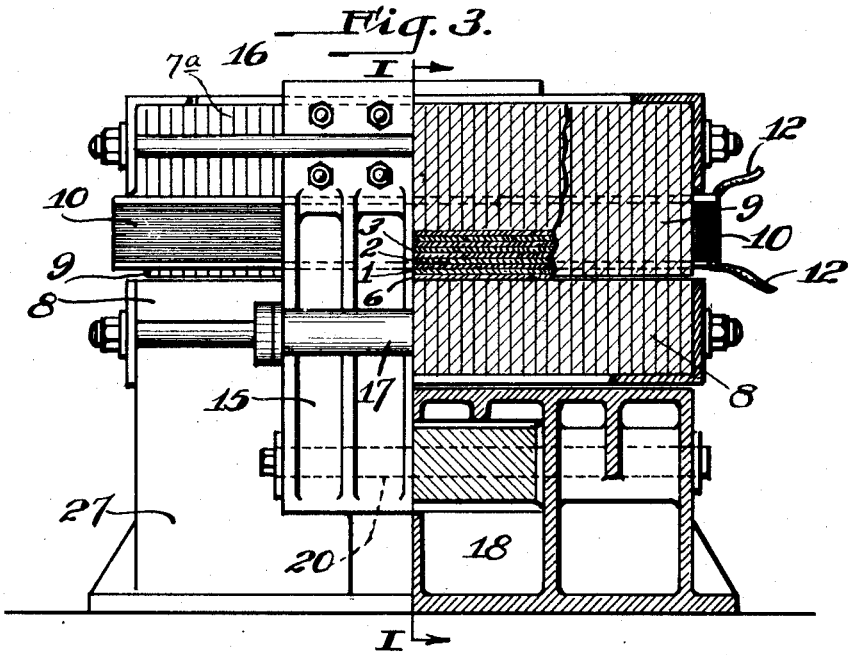
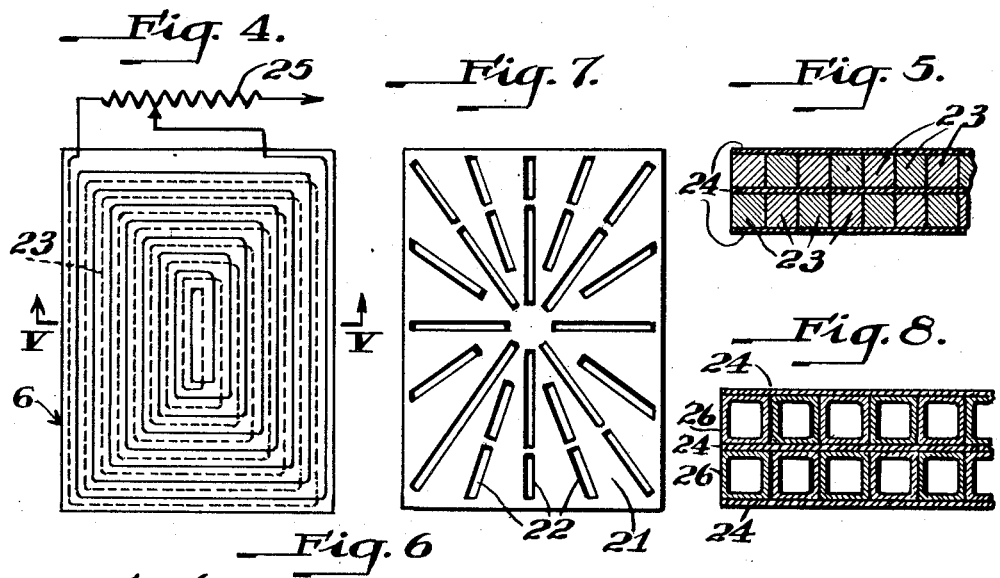
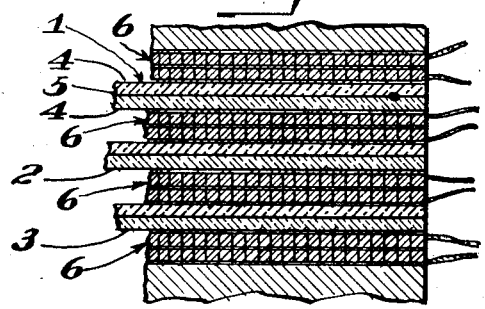
INVENTOR
Alfred L. Harrington
by
James E. Bradley
atty Patented Oct. 7, 1930

1,777,642

UNITED STATES PATENT OFFICE

ALFRED L. HARRINGTON, OF ROSSLYN FARMS, PENNSYLVANIA, ASSIGNOR TO PITTSBURGH PLATE GLASS COMPANY, A CORPORATION OF PENNSYLVANIA

PROCESS AND APPARATUS FOR MAKING COMPOSITE GLASS

Application filed June 22, 1929. Serial No. 372,854.

The invention relates to a process and apparatus for making what is known as composite or non-shatter glass. Such glass ordinarily comprises two sheets of glass with an interposed sheet of pyroxylin plastic, such as pyralin or celluloid, although in some cases the composite sheet is made up of three sheets of glass and two sheets of plastic. The glass and pyralin are ordinarily cemented together by the use of gelatin, which is placed in thin films on the inner faces of the glass sheets and allowed to dry preliminary to the cementing operation. The sheets are then placed in assembled relation and heat and pressure applied to soften the cement and secure adhesion, the composite plate thus formed being allowed to cool down under pressure. The pressure applied may range from 100 to 150 pounds per square inch, and the temperature required is in the neighborhood of 250 degrees F. The present invention relates to an improved process and apparatus for securing the necessary temperature conditions during the application of pressure, and the provision of a process and apparatus for accomplishing the compositing function in a minimum of time and at a low cost.

Generally speaking, the desired result is secured by placing the sheets (with their coatings of cement) in the line of approach between an electro-magnet (energized by alternating current) and its armature in order to secure the pressing effect necessary, and utilizing the heating effect of the magnetic lines of force in order to bring the sheets up to the desired temperature. In order to secure this heating effect, metal plates or windings are interspersed between the sets of plates in which the magnetic lines of force induce currents sufficient to heat the plates. Alternating current can thus be utilized to provide both the power and heat required to composite the glass as heretofore described. One embodiment of the invention is illustrated in the accompanying drawings, wherein:

Figure 1 is a partial side elevation and partial section on the line I—I of Fig. 3. Fig. 2 is a plan view. Fig. 3 is, as to its left hand half, an end elevation, and, as to its right hand half, a section taken in part on the line III—III of Fig. 1 and in part on the line III$^a$—III$^a$ of such figure. Fig. 4 is a plan view of one form of induction heating element which may be employed. Fig. 5 is a section of the line V—V of Fig. 4. Fig. 6 is an enlarged section through a stack of sheets and heating elements. Fig. 7 is a plan view of a modified form of heating element, and Fig. 8 is a section through still another form of heating element.

Referring to the drawings, 1, 2, 3, etc. (Figs. 1 and 6), are a series of sets of sheets to be composited, each set being made up of two sheets of glass 4, 4 and a pyralin or celluloid sheet 5 therebetween with a coating of cement on the inner faces of the glass sheets next to the celluloid. On each side of each set of sheets is an element 6, which is to be heated by induction, as hereinafter described, such elements being either the metal plates shown in Fig. 7 or the flat coils of wire shown in Figs. 4, 5 and 8. The stack of sheets and elements is placed for pressing between the consequent pole 7 (Fig. 1) of an electro magnet and the armature bar 8 of the magnet, such bar being of laminated construction, as indicated in Fig. 3.

The magnet comprises a pair of salient poles 9, 9 surrounded by the windings 10, 10, such poles being connected by the bar 7$^a$ which carries the consequent pole 7 heretofore referred to. The parts 7$^a$, 7 and 9 are of laminated construction, as shown in Fig. 1. Alternating current is supplied to the windings through the leads 11, 11 and 12, 12. The armature 8 is mounted in fixed position on the base 27, and the magnet is mounted for movement up and down to give the necessary pressing action and to permit the insertion and removal of the sets of sheets. Power is provided, to secure the upward movement of the magnet, by the hydraulic plungers 13, 13 mounted in the cylinders 14, 14.

The plungers engage the ends of the links 15, 15 of non-magnetic metal secured at their upper ends to the bar 7$^a$ by the bolts 16, 16 and guided in their movements by the rollers 17, 17 carried by the armature bar 8. In order to maintain the bar 7ª in parallelism with the bar 8 and insure that the poles 9, 9 shall always be at equal distances from the face of the armature, the equalizing levers 18, 18 are employed, engaged at their outer ends by the links 15, 15. These levers are mounted on pivots 19, 19 carried by the base 27 and are connected at their inner ends by the pin 20. The face of the pole 7 is thus maintained parallel to the upper face of the bar 8, thus insuring a uniform application of pressure to the stack of plates.

The heating elements 6 between which the sets of sheets are placed, may be of the form shown in Fig. 7 or in the forms shown in Figs. 4, 5 and 8. The plate 21 is of good conducting metal, such as copper, slotted at 22 as indicated in order to interrupt the eddy currents set up in the plate and thus make the heating of the plate more uniform. Preferably, however, the heating elements are constructed, as shown in Figs. 4 and 5 or as shown in Fig. 8. The element as shown in Figs. 4 and 5 comprises two coils 23 of flat wire preferably insulated by a coating lacquer and by the mica plates 24, 24, 24. The ends of the wire are connected through the adjustable resistance 25. This heating element is heated uniformly by the induced current and the amount of heating may be increased by decreasing the resistance at 25, or decreased by increasing such resistance. In the heating element of Fig. 8 heating coils 26, 26 of hollow wire are used instead of the solid wire of the Fig. 5 construction, the insulating means and resistance being arranged as shown in Figs. 4 and 5. This construction makes it possible to cool the elements after the heating and pressing operation and while the stack of sheets is still maintained under pressure. This may be accomplished by circulating water through the coils. This increases the capacity of the apparatus as otherwise the cooling of the stack of sheets requires a considerable time. In both the constructions of Figs. 4 and 5 and Fig. 8, the two coils are in series connected at a point near the centers of the coils.

In operation the stack of plates is assembled as shown in Fig. 6 and placed between the pole 7 and the armature 8, as shown in Fig. 1, after which alternating current is supplied through the magnet windings. The bar 7ª is thus drawn down by magnetic attraction giving the desired pressure upon the stack of sheets. The magnetic lines of force induced by the flow of current through the windings, follow a path including the bar 7ª, the consequent pole 7 and the armature 8, and this induces current in coils of the heating elements 6, 6, etc. which heats these elements, such elements being the equivalent of the secondary coil in a transformer. Sufficient heat is generated by the current thus induced in the heating elements to heat the stack of plates to the desired degree. The current is then interrupted and the stack of sheets allowed to cool down under the weight of the bar 7ª and the parts associated therewith. In case the heating elements made up of hollow wire shown in Fig. 8 are employed, the cooling of the stack of sheets is speeded up by circulating a cooling liquid, such as water, through the coils. In order to remove the sheets pressure is admitted to the cylinders 14, 14, thus lifting the links 15, 15 and the bar 7ª with its coils and freeing the stack of plates.

What I claim is:

1. A process of applying heat and pressure to a plurality of sheets of glass and reinforcing material, which consists in placing the sheets in stacked relation with interspersed induction heating elements in the line of approach between an electromagnet and its armature and in the path of the magnetic lines of force generated when the winding of the magnet is energized, and supplying alternating current to the magnet winding.

2. A process of applying heat and pressure to a plurality of sheets of glass and reinforcing material, which consists in placing the sheets in stacked relation with interspersed hollow induction heating elements in the line of approach between an electromagnet and its armature, and in the path of the magnetic lines of force generated when the winding of the magnet is energized, supplying alternating current to the magnet winding to secure the application of pressure to the stack of sheets and to heat said elements and sheets to the desired temperature, and then circulating a cooling medium through said heating elements.

3. Apparatus for applying heat and pressure to a plurality of sheets of glass and reinforcing material to produce a composite plate, comprising an electromagnet and an armature therefor adapted to receive the sheets between them in stacked relation, flat induction heating elements adapted to be stacked with the sheets, and means for supplying alternating current to the winding of the magnet, said stack of sheets and the heating elements being located in the lines of magnetic force generated when current is supplied to said winding.

4. Apparatus for applying heat and pressure to a plurality of sheets of glass and reinforcing material to produce a composite plate, comprising an electromagnet and an armature therefor adapted to receive the sheets between them in stacked relation, flat induction heating elements adapted to be stacked with the sheets, and means for supplying alternating current to the winding of the magnet, said stack of sheets and the heating elements being located in the lines of magnetic force generated when current is supplied to said winding, and said heating elements each comprising a helix of insulated wire.

5. Apparatus for applying heat and pressure to a plurality of sheets of glass and reinforcing material to produce a composite plate, comprising an electromagnet and an armature therefor adapted to receive the sheets between them in stacked relation, flat induction heating elements adapted to be stacked with the sheets, and means for supplying alternating current to the winding of the magnet, said stack of sheets and the heating elements being located in the lines of magnetic force generated when current is supplied to said winding, and said heating elements each comprising a helix of insulated wire with an adjustable resistance between the ends of the wire.

6. Apparatus for applying heat and pressure to a plurality of sheets of glass and reinforcing material to produce a composite plate, comprising an electromagnet and an armature therefor adapted to receive the sheets between them in stacked relation, flat induction heating elements adapted to be stacked with the sheets, and means for supplying alternating current to the winding of the magnet, said stack of sheets and the heating elements being located in the lines of magnetic force generated when current is supplied to said winding, and said heating elements each comprising two helices of wire connected adjacent the centers of the helices with an adjustable resistance between the other ends of the wire.

7. Apparatus for applying heat and pressure to a plurality of sheets of glass and reinforcing material to produce a composite plate, comprising a pair of electromagnets with a connecting bar of magnetic material carrying the poles of said magnets, an armature bar in parallel with the connecting bar with its ends in opposition to said poles, a space being provided intermediate the ends of the bars to receive said sheets in stacked relation, flat induction heating elements adapted to be stacked with said sheets, and equalizing means between said bars for maintaining them in parallelism during their movement of approach.

In testimony whereof, I have hereunto subscribed my name this 4th day of June, 1929.

ALFRED L. HARRINGTON.